INVENTOR
F. J. FUCHS, JR
BY MARN & JANGARATHIS
ATTORNEY

United States Patent Office 3,459,021
Patented Aug. 5, 1969

3,459,021
APPARATUS FOR DEEP DRAWING SOLID
PLASTIC MATERIALS
Francis Joseph Fuchs, Jr., Princeton Junction, N.J., assignor to Western Electric Company, Incorporated, New York, N.Y., a corporation of New York
Filed Sept. 9, 1966, Ser. No. 578,279
Int. Cl. B21d 22/10, 25/18, 22/20
U.S. Cl. 72—60                                    12 Claims

ABSTRACT OF THE DISCLOSURE

Deep drawing apparatus including structure defining a pressure chamber for applying pressure to a blank, a removable plug for sealing the pressure chamber, mechanical locking apparatus including a plurality of radially displaceable, slidingly interlocked segments for securing the plug against pressurized fluid received within the pressure chamber, and means advanceable through the pressure chamber for drawing the blank into the draw die. Also disclosed is a breech or bore locking mechanism including a plurality of radially disposed, slidingly interlocked segments radially displaceable to and from a securely locked position by the quick and simple axial displacement of a tapered ram.

---

This invention relates generally to apparatus for deep drawing solid plastic materials, and, more particularly, to apparatus utilizing high hydrostatic pressure for deep drawing large blanks of solid plastic materials. This invention also relates to a new and improved mechanical locking mechanism for locking a breech or bore, which mechanism can be locked quickly and simply in a highly secure manner.

With reference to the expression "solid plastic material," it is known by those skilled in the art, that many metals and other materials increase in ductility, or have an increased capacity for deformation without fracture, when they are subjected to high hydrostatic pressure. These metals and other materials are known as "solid plastic materials." This principle is treated in P. W. Bridgman, "Large Plastic Flow and Fracture," published by McGraw-Hill Book Company of New York in 1952. Accordingly, it will be understood that the expression "solid plastic material" as used in this specification and claims, is used in this context.

Generally, the apparatus utilizing high hydrostatic pressure for deep drawing blanks of solid plastic materials is rather large and bulky in comparison with the size of the product it produces. For example, in the deep drawing of a 4-inch blank of steel, pressures upwards of 150,000 p.s.i. are required, and such pressures typically require the employment of a conventional 1,000-ton press. Such a press typically is 12 feet high, weighs approximately 38,000 pounds, and is very costly. Obviously, the size, weight and cost of such a press does not make it of bench model proportions and, moreover, such mass and bulk can preclude the use of such a press in many industrial situations where it would otherwise be highly desirable to employ deep drawing apparatus.

Accordingly, it is the primary object of the present invention to provide apparatus utilizing high hydrostatic pressure for deep drawing solid plastic material, wherein the deep drawing apparatus is of comparative reduced size and weight.

The aforementioned consideration of massiveness and bulkiness is particularly acute in the deep drawing of large blanks of solid plastic materials. For example, deep drawing apparatus utilizing high hydrostatic pressure, of the above referred to general type, were to be used to deep draw a blank of steel (a solid plastic material), three feet in diameter, the typical conventional press for such apparatus would have to be of such size as to most likely render it unavailable commercially, and certainly not readily available even on a custom order. Further, the size of such a typical, conventional press would, in many applications, render its use unfeasible if not impossible, and hence would preclude the possibility of deep drawing utilizing high hydrostatic pressure to produce desired parts or products, thereby causing the use of other more expensive production techniques, such as forging or casting.

Accordingly, it is another object of the present invention to provide apparatus utilizing high hydrostatic pressure for the deep drawing of large blanks of solid plastic material, wherein such apparatus is of comparative reduced size and weight.

In one embodiment of the present invention, hydrostatic deep drawing of a 4-inch blank of steel (a solid plastic material), can be accomplished with only a 25-ton press, as compared with the conventionally required 1,000-ton press, referred to above.

More specifically, in some deep drawing apparatus employing high hydrostatic pressure, the ram or punch for engaging and deep drawing a blank of material subjected to high hydrostatic pressure, must not only pressurize a body of pressure fluid, but must also take up, or accommodate, substantially all of the vertical reactive hydrostatic forces created in the pressurizing of the pressure fluid. This requires that the piston or ram be of greater size and weight than would otherwise be required if the draw ram or punch were not required to accommodate the vertical reactive hydrostatic forces created in the pressurizing of the pressure fluid. Thus, if apparatus for hydrostatic deep drawing could be provided wherein the ram or piston were only required to engage and deep draw a blank of material already subjected to high hydrostatic pressure, the ram or piston could be of comparative reduced size and weight, hence the press for operating the ram or piston could be of reduced size and weight, and finally, the overall hydrostatic deep drawing apparatus could be of reduced size and weight.

Accordingly, a further object of the present invention is to provide apparatus for hydrostatic deep drawing, wherein the draw ram or piston is not required to take up or accommodate veritcal reactive forces created in the pressurization of the pressure fluid.

Further, it has been found that if the fluid pressure chamber of hydrostatic deep drawing apparatus can be satisfactorily locked mechanically, and if a mechancial locking mechanism can accommodate the vertical reactive forces created within the pressure chamber, the draw ram or piston can be freed of the burden of accommodating such vertical reactive hydrostatic forces, and hence, a smaller ram and press can be utilized to deep draw blanks of a given size.

Therefore, it is a further object of the present invention to provide a new and improved mechanism for mechanically locking a breech, or bore, such as for example, the pressure chamber of hydrostatic deep drawing apparatus.

Additionally, it has been discovered that if such mechanical locking mechanism can be pre-loaded, i.e., prestressed in a direction opposite to the direction of the forces to be accommodated, the locking mechanism can be of smaller size than would be required without such pre-loading. Further, highly desirable benefits and advantages would accrue if such mechanical locking mechanism can be locked quickly and simply, in a highly secure manner.

Therefore, yet a further object of the present invention is to provide a new and improved mechanical mechanism for locking a breech, or bore, which mechanism can be pre-loaded and which can be locked quickly and simply, in a highly secure manner.

An even more complete understanding of the present invention may be obtained from the following detailed description when read in conjunction with the appended drawing wherein.

Figure 1:
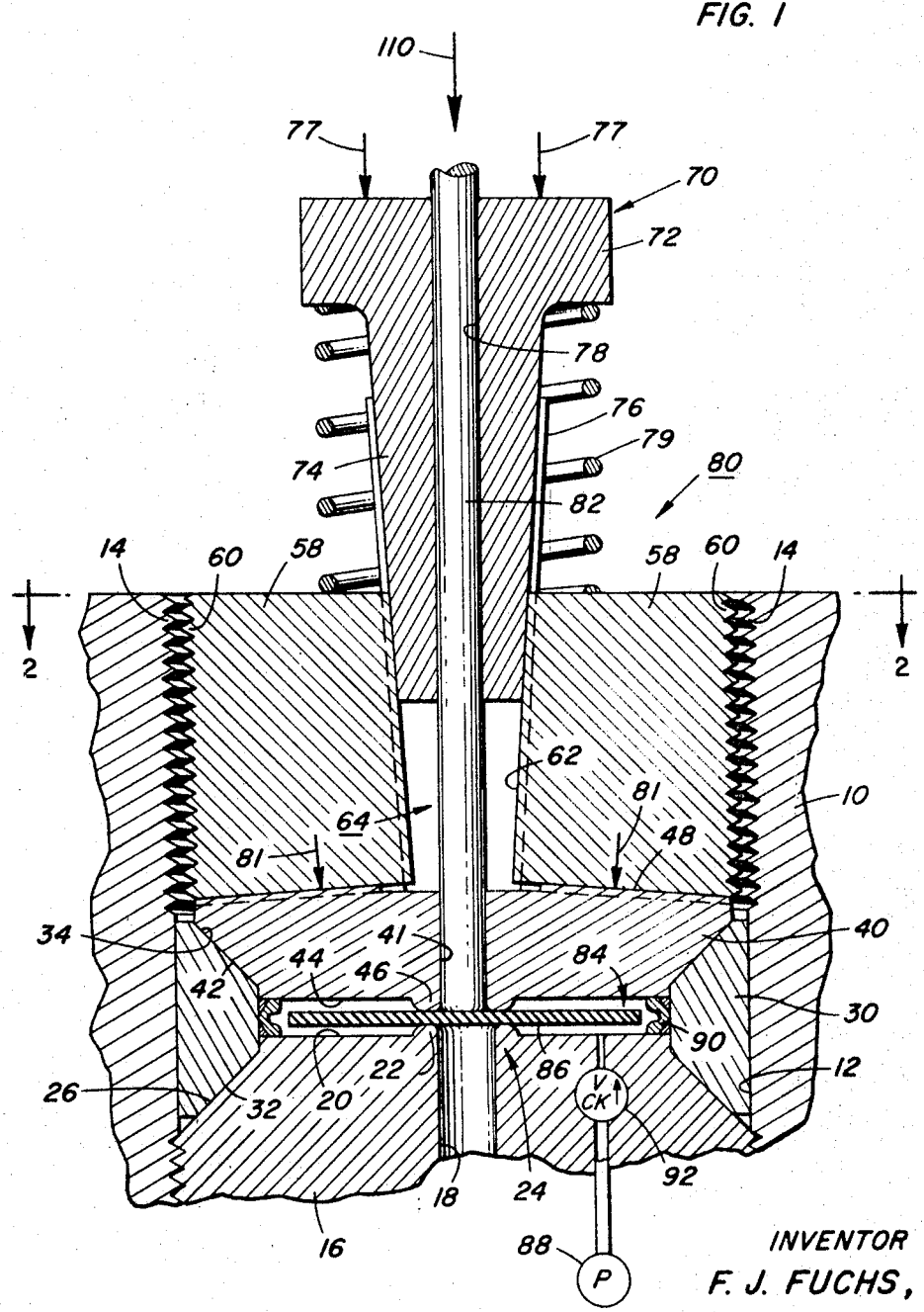
FIG. 1 is a vertical, cross-sectional view taken substantially along the line 1—1 in FIG. 2, of a preferred embodiment of apparatus of the present invention.

Referring now to FIG. 1, there is shown hydrostatic deep drawing apparatus embodying the present invention, and including a pressure vessel 10 provided with a cylindrical bore 12 which forms, generally, a cylindrically-shaped pressure chamber. The lower portion of the bore 12 is threaded as shown, and the upper portion of the bore is provided with a plurality of rows of teeth 14.

A lower plug 16 is threaded as shown, into the lower portion of the bore 12, and is provided with a centrally formed bore 18. The top of the lower plug 16 is provided with a flat annularly shaped upper surface 20, and an annularly shaped projection 22 formed integrally with the upper surface 20 and the bore 18. The upper portion of the bottom plug 16 is provided with an annularly shaped inclined or beveled surface 26.

An annular retaining ring 30 is dimensioned for close accommodation within the bore 12. The retaining ring is of generally wedge-shaped cross-sectional configuration, and is provided with annularly shaped inclined or beveled surfaces 32 and 34; the surface 32 being for complementary engagement with the inclined surface 26 of the bottom plug 16.

A generally annularly shaped, top plug 40 is dimensioned for ready entry into, and removal from, the top portion of the bore 12. The top plug is provided with a centrally formed bore 41, and an annularly shaped inclined or beveled surface 42 for complementary engagement with the beveled surface 34 of the annular retaining ring 30. The bottom portion of the top plug is provided with an annularly shaped, flat surface 44, and an annularly shaped projection 46. The top portion of the top plug 40 is provided with an annularly shaped, inclined or beveled surface 48, which surface will be referred to later.

Figure 2:
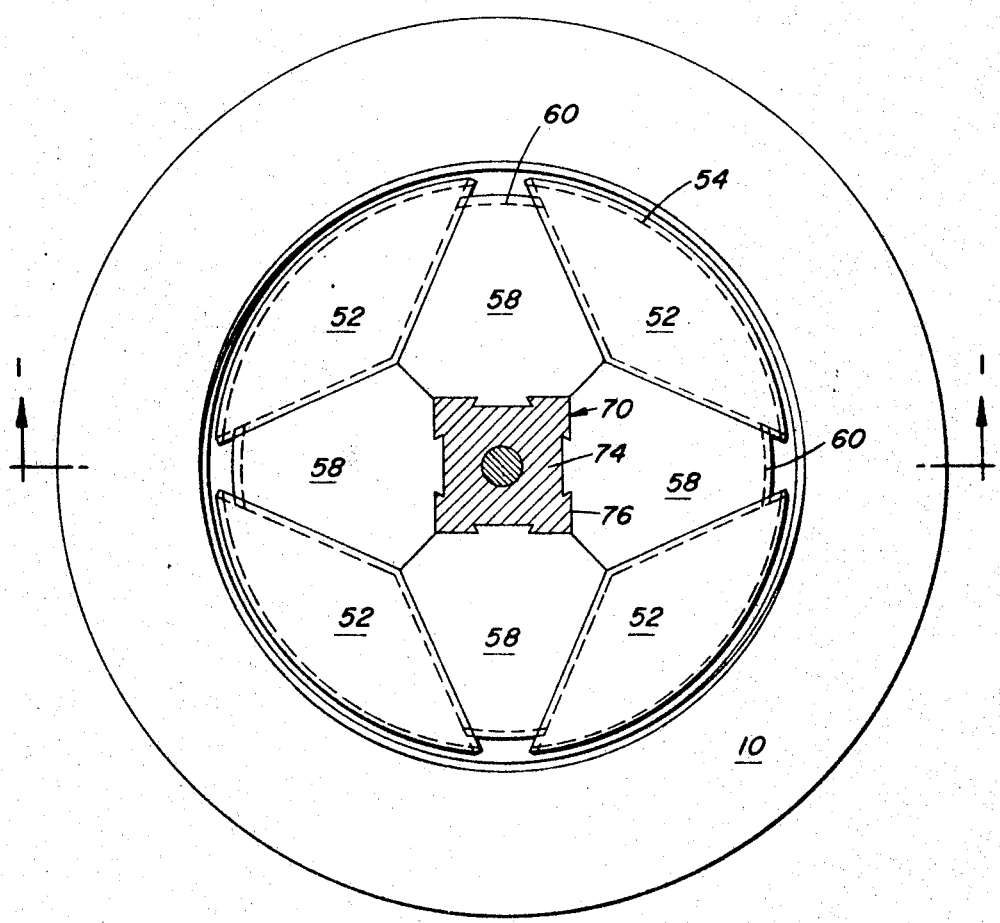
FIG. 2 is a modified plan view with a portion in cross-section taken substantially along the line 2—2 in FIG. 1, of the apparatus of FIG. 1, showing the mechanical locking mechanism collapsed.

Referring now to FIG. 2, there are shown four primary segments 52, each being provided along its outer surface with a plurality of rows of teeth 54 (FIG. 1) for complementary engagement with the plurality of rows of teeth 14 provided along the upper portion of the bore 12. An intermediate segment 58 is positioned between each adjacent pair of primary segments 52, and each intermediate segment is also provided along its outer surface with a plurality of rows of teeth 60 for complementary engagement with the plurality of rows of teeth 14 formed in the bore 12.

The bottom surfaces of the primary segments 52 and intermediate segments 58 (FIG. 1), and the annularly shaped beveled top surface 48 of the top plug 40, are suitably shaped in complementary configuration so as to be dovetailed together, in the manner well-known in the art, to provide sliding, interlocking, movement of the segments radially inward and radially outward, along the beveled top surface 48 of the top plug 40. Similarly, the abutting vertical surfaces of the primary and intermediate segments are suitably shaped in complementary configuration, in the manner well-known in the art, to provide relative sliding, interlocking, movement of the segments radially inward to a collapsed position, and radially outward into an expanded position.

The inner surfaces 62 of the primary and intermediate segments are inclined, as can be seen in FIG. 1, and such inclined surfaces define, generally, a tapered bore of varying rectangular configuration, as indicated by the general numerical designation 64.

Figure 3:
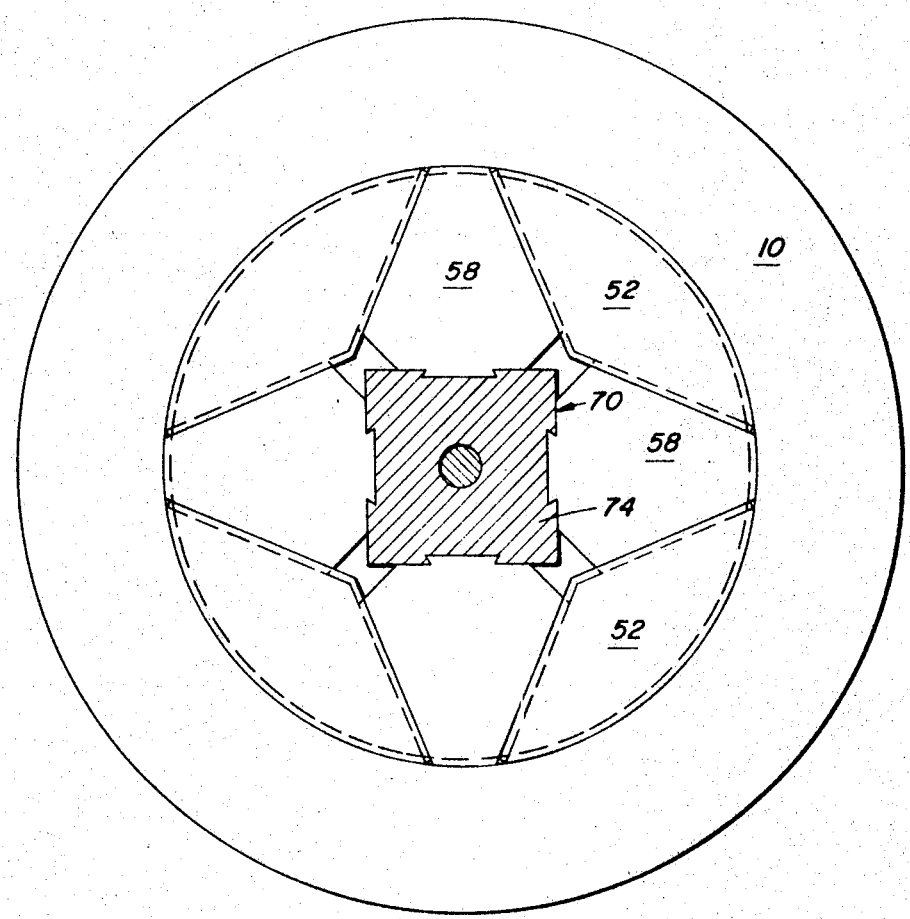
FIG. 3 is a view similar to FIG. 2 but showing the mechanical locking mechanism expanded.

Referring now primarily to FIG. 1, the hydrostatic deep drawing apparatus also includes a ram 70 provided with a head portion 72, a tapered shank portion 74 of varying, rectangular, cross-sectional configuration, and a centrally formed bore 78. The shank portion 74 is tapered for complementary accommodation within the tapered bore 64. Arrayed around the shank portion 74, as shown in FIGS. 2 and 3, are the primary and intermediate segments 52 and 58, respectively. The outer surfaces 76 of the shank portion 74, and the inner surfaces 62 of the intermediate segments 58, are suitably shaped in complementary configuration so as to be dovetailed together, in the manner well-known in the art, to provide sliding, interlocking, relative, vertical movement between the ram and the segments. The ram is biased or urged upwardly by a compression spring 79 which surrounds the shank portion of the ram. The bottom of the spring is in engagement with the top surface of at least one of the segments and suitably fixedly secured thereto, such as by welding; and the top of the spring is in engagement with the underside of the head portion 72 of the ram and suitably fixedly secured thereto, such as by welding.

Thus, it will be understood that, due to the aforementioned dovetailed interconnections and the welded interconnections of the spring 79, the top plug 40, the primary segments 52 and the intermediate segments 58, and the ram 70 form collectively, a unitary, mechanical, locking assemblage indicated by the general numerical designation 80. As shown in FIG. 2, the locking assemblage 80 is in its collapsed position the outer dimensions of which permit ready entry into, and removal from, the bore 12 of the pressure vessel 10; and as shown in FIG. 3, the locking assemblage is in its expanded position with the primary and intermediate segments providing locking action around a full 360°.

With regard to the operation of the locking assemblage, i.e., movement from the collapsed position into the expanded position, it will be understood that, upon the insertion of the collapsed locking assemblage into the bore 12 of the pressure vessel 10 and upon the application of suitable downward forces to the ram head portion 72, such as from a conventional press and as indicated by the arrows 77 (FIG. 1), the ram is forced downwardly against the action of the spring 79 thereby compressing the spring. The tapered shank portion 74 of the ram moves downwardly and forces the intermediate segments downwardly and radially outwardly, and the intermediate segments in turn, force the primary segments downwardly and radially outwardly. Upon such downward and radially outward movement of the segments, the teeth 54 of the segments are forced into engagement with the teeth 14 of the bore 12, as shown in FIG. 3. The pitch of the rows of teeth 14 is such that, upon engagement by the teeth 54, the teeth 14 cam the primary and intermediate segments downwardly and radially outwardly and thus assist the ram 70 in positioning the segments. The downward movement of the segments forces the top plug 40 downwardly into engagement with the annular ring 30, and the length of the downward movement of the ram and segments is sufficient to tend to force the top plug downward a distance greater than is possible due to the presence and positionment of the annular ring 30 and the bottom plug 16.

Further, it will be understood, that since the segments 52 and 58 engage the inclined or beveled annular surface 48 of the top plug 40, the forces applied to the top plug by the segments (as indicated by the arrows 81–81, FIG. 1) will not only be acting downwardly, but will also be acting convergently and radially inwardly, thereby tending to pre-stress or pre-load the top plug both downwardly and radially inwardly. Additionally, since the top plug 40 is supported horizontally by the engagement of its beveled surface 42 with the beveled surface 34 of the annular retaining ring 30, the manner of horizontal supporting of the top plug assists in causing the top plug to be pre-stressed or pre-loaded downwardly and radially inwardly upon the application of the forces indicated by the arrows 81–81. Thus, it will be further understood, that the central annular portion of the top plug 40 is pre-stressed or pre-loaded downwardly and radially inwardly a greater amount than is the outer annular portion of the top plug. Accordingly, the pre-stress or pre-loading forces applied to the top plug 40 tend to concentrate in the annular projection 46.

Upon the removal of the forces 77, the spring 79 urges and moves the ram 70 upwardly, and the upward movement of the tapered shank portion 74 relieves the forces acting downwardly and radially outwardly against the intermediate segments, and due to the dovetailed interconnections between the intermediate segments and the shank portion 74, the upward movement of the ram also moves the intermediate segments radially inwardly. Such radial inward movement of the intermediate segments, in turn, due to the dovetailed interconnections between and intermediate segments and the primary segments, relieves the forces acting downward and radially outward against the primary segments, and moves the primary segments radially inwardly; both the primary and intermediate segments sliding along the inclined annular surface 48 and collapsing around the ram shank portion 74 to the position shown in FIG. 2. Such movement of the primary and intermediate segments unlocks or disengages the segment teeth 54 from the teeth 14 of the bore 12. Further, upon the relief of the forces acting on the primary and intermediate segments, and upon their radial inward movement, the forces, indicated by the arrows 81–81, acting on the top plug 40 are also relieved. Accordingly, the entire locking assemblage 80, due to the dovetailed interconnections between the segments and the ram shank portion and between the segments and the top plug, can be, as shown in FIG. 2, readily lifted out or removed from the bore 12 as a unitary assemblage.

Referring again generally to the hydrostatic deep draw apparatus of FIG. 1, the apparatus also includes a draw ram or punch 82 mounted suitably concentric of the ram 70, for reciprocating movement within the bore 78 of the ram. The draw ram or punch is also mounted, and dimensioned, for reciprocating movement through the bore 41 of the top plug 40, and the bore 18 formed in the bottom plug 16.

With the structural elements positioned as shown in FIG. 1, it will be further understood that the annularly shaped bottom surface 44 and annular projection 46 of the top plug 40, the inner surface of the annular retaining ring 30, and the annularly shaped surface 20 and annular projection 22 of the bottom plug 16, cooperatively define an annular high pressure chamber indicated by the general numerical designation 84, for closely accommodating the peripheral portion of a disc-shaped blank 86 of solid plastic material. Further, it will also be understood that the opposed annular projections 22 and 46 form an annular extrusion die through which the blank of solid plastic material is to be extruded, and that the bore 18 provides a draw die into which the blank of solid plastic material is to be deep drawn.

The annular high pressure chamber 84 as shown, is in communication with a suitable high pressure fluid pump 88, of a type well-known in the art, through an intermediate pressure valve 92.

Residing within the high pressure chamber 84, is an annular high pressure seal 90, made of some suitable material such as Teflon or beryllium-copper. The high pressure seal 90, upon the admission of fluid under high pressure into the pressure chamber 84 seals off any leak orifices which may tend to develop between the annular inclined surfaces 34 and 26 of the retaining ring 30, and the complementary annular inclined surfaces 42 and 26 of the top and bottom plugs 40 and 30, respectively.

Operation

It will be assumed that the locking assemblage 80 has been collapsed, and that the locking assemblage has been lifted out of the upper portion of the bore 12 of the pressure blank 86 of some solid plastic material, has been inserted into the high pressure chamber 84, and has been placed over, and is residing on, the annular projection 22. It will now be assumed that the unitary locking assemblage 80 has been inserted into the upper portion of the bore 12, and that in response to suitable downwardly acting forces 77, such as the simple translational force supplied by a conventional press, the locking assemblage has been locked into position as described above, with the attendant pre-stressing or pre-loading of the top plug 40. And it will be understood, that the amount of downward movement of the top plug 40 is such that the annular projections 22 and 46 "bite" or "dig into" the blank 86 to such a depth that the annular projections seal off the central portion of the blank from the outer peripheral portion of the blank, which peripheral portion is confined closely within the annular pressure chamber 84.

Fluid, under high pressure from the fluid pump 88, will now be admitted through the pressure valve 92 into the high pressure chamber 84. The pressure of the fluid in the high pressure chamber will build up until the desired high hydrostatic pressure is achieved, and it will be understood that the annular projections 22 and 46, which as described above, "bite" or "dig into" the blank 86, seal off the central portion of the blank from the outer peripheral portion of the blank confined within the annular pressure chamber 84, to prevent the pressurized fluid in the pressure chamber from escaping into the bores 18 and 41. The fluid in the pressure chamber 84 under high hydrostatic pressure, surrounds the peripheral portion of the blank, and subjects the peripheral portion of the blank 86 to high hydrostatic pressure sufficiently great to cause the blank 86 to increase in ductility sufficiently to permit the blank to be deformed, e.g., extruded and deep drawn, without fracture.

Figure 4:
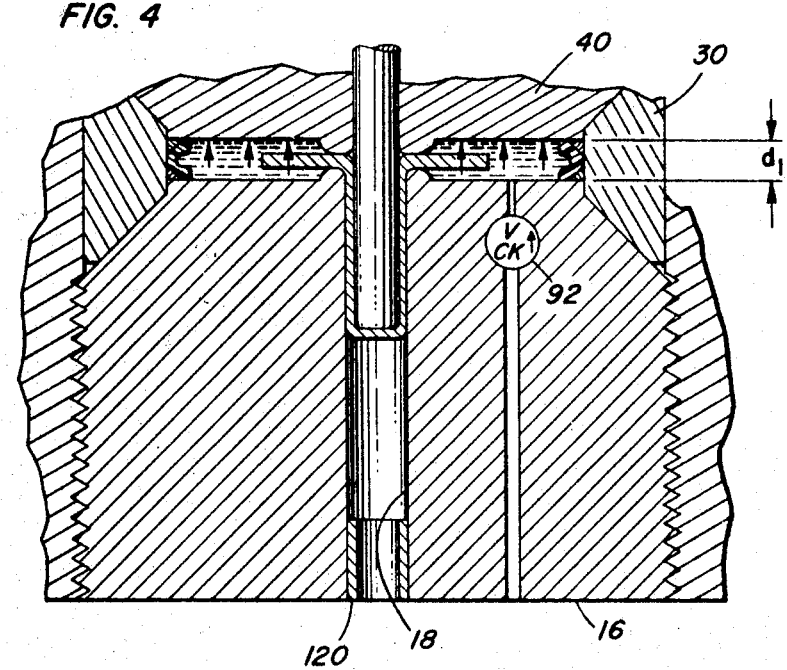
FIG. 4 is a fragmentary view of FIG. 1, showing the deep drawing of a blank of solid plastic material.

In timed sequence with the admission of the pressure fluid into the high pressure chamber 84, and the blank 86 assuming the aforementioned state of increased ductility, the draw ram or punch 82 will be driven downwardly by the application of some suitable downward force, such as represented by the arrow 110, and the end of the ram will engage the central portion of the blank 86. The hydrostatic deep drawing apparatus of the present invention will then practice certain ones of the methods of deep drawing disclosed and claimed in a co-pending application of Mr. F. J. Fuchs, Jr., filed Sept. 9, 1966, and having application Ser. No. 578,280, and the blank 86 will be deep drawn to the desired depth as shown in FIG. 4. For example, the end of the punch 82 will engage the central portion of the blank 100 and the ram, in cooperation with the high hydrostatic pressure applied to the peripheral portion of the blank, will extrude the peripheral portion of the blank radially inwardly through the annular extrusion die provided by the annular projections 22 and 46; and the ram will deep draw the extruded peripheral portion to the desired depth as shown in FIG. 4.

Upon the completion of the desired deep drawing, the high pressure chamber 84 will be suitably exhausted, the forces indicated by the arrows 77 will be removed, and the aforementioned collapsing of the locking assemblage 80 will occur. The locking assemblage will be readily lifted out of the bore 12, making the deep drawn shell readily accessible for removal.

It will be understood by those skilled in the art, that, as shown in FIG. 4, the blank may be deep drawn into the atmosphere, or if desired, the blank may be deep drawn against the application of a suitable back pressure, such as the back pressure applied by the fluid in the cavity 32 of FIG. 3 of the above-mentioned co-pending application.

It will be further appreciated by those skilled in the art, that the apparatus of the present invention can be utilized to form hollow, cylindrically shaped, tubular members, by further practicing another method taught by the above-mentioned co-pending application. More specifically, the deep drawn tubular shell of FIG. 4 can be forced further downwardly, by the ram or punch 82, into engagement with an annularly shaped die 120 provided in the bore 18. The annular die 120, it will be further appreciated by those skilled in the art, will be complementary in width to the thickness of the walls of the deep drawn shell, and complementary in bore or opening to the diameter of the punch 82. Thus, the annular die can be utilized to punch out or remove the central portion of the drawn shell, and thereby form the drawn shell into a tubular or hollow cylindrical member.

Figure 5:
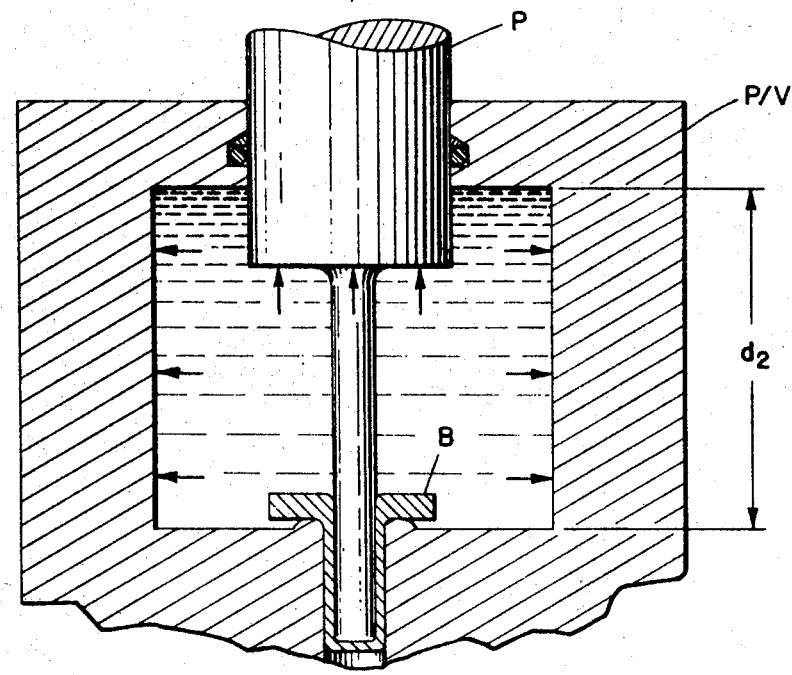
FIG. 5 is a diagrammatic representation in cross-section, of other hydrostatic deep drawing apparatus, over which the apparatus of the present invention is an improvement.

Referring now to FIGS. 4 and 5, it will be further noted that the length of the pressure chamber $d_1$, of the present invention of FIG. 4, is exceedingly reduced as compared with the length of the pressure chamber $d_2$, of the structure of FIG. 5; the structure of FIG. 5 being generally representative of other deep drawing apparatus utilizing high hydrostatic pressure, which although highly suitable for many deep drawing operations, especially those involving small sized blanks, has the aforementioned considerations of mass, size and bulkiness, if utilized to deep draw large sized blanks of solid plastic materials. Thus, it will be appreciated by those skilled in the art, that for the deep drawing of the same size blanks of solid plastic materials, that the pressure vessel 10 of FIG. 1, compared with the pressure vessel P/V of FIG. 5, can be comparatively smaller, less massive and less bulky, since the pressure vessel P/V, of FIG. 5, must be of sufficient size and mass to accommodate and withstand the radial hydrostatic forces (indicated by the horizontal arrows) which are distributed along its entire length $d_2$ upon the pressurization of the fluid within the pressure vessel. Obviously, such advantage of the structure of FIG. 4 is compared with the structure of FIG. 5, is even more significant in the deep drawing of large blanks, such as blanks several feet in diameter.

With further regard to the structure of FIG. 5, the ram or piston P must not only be of sufficient size to pressurize the fluid sufficient to deep drawn the blank B, but must also be of sufficient size to also take up or accommodate the vertical reactive hydrostatic forces (indicated by the upwardly pointing arrows) created by the pressurization of the fluid. However, with the structure of the present invention as embodied in FIG. 4, no vertical reactive hydrostatic forces are accommodated by the punch 82, as all the vertical reactive hydrostatic forces are taken up or accommodated by the locking assemblage 80, and since the bottom plug 40 is pre-stressed or pre-loaded against vertical hydrostatic forces to be applied thereto, the plug, and hence the entire locking assemblage, can be smaller than would otherwise be required without such pre-loading or pre-stressing.

Referring again to FIG. 4, it will be understood by those skilled in the art, that during the application of the high hydrostatic forces to the peripheral portion of the blank 86, and the extrusion thereof, that there will be a tendency of the upwardly acting high hydrostatic forces to move or force the top plug 40 upwardly, and that the effect of such tendency will be most critical in the central portion of the plug, i.e., the annular projection 46. The annular projection must be maintained downward to "bite" or "dig into" the blank 86, as described above, in order for the present apparatus to practice the above-referred to methods of deep drawing. Accordingly, it will be further understood by those skilled in the art that the above-described manner of pre-stressing or pre-loading of the top plug, wherein the pre-loading forces tend to be convergent in the annular projection 46, places the pre-loading or pre-stressing at the places of greatest need and at the place where the greatest benefit can be derived, viz., at the annular projection 46.

Referring again to the locking assemblage 80, the simplicity and security of the locking action of such new and improved locking mechanism will be appreciated by those skilled in the art, especially when compared with other conventional or typical mechanisms for locking a breech, or bore, such as for example, the well-known and widely-used, interrupted screw.

The locking action of the interrupted screw requires two distinct motions or movements, one, an inward movement into the breech or bore, and two, a rotational motion for final locking; the typical apparatus for providing such inward and rotational movements being expensive and complex. Also, as is known in the art, the interrupted screw provides locking action along only a fractional part of its periphery, never greater than 50%.

Other conventional breech or bore locking mechanisms must be screwed or threaded into the bore or breech, and the screwing or threading action is typically time consuming, and the apparatus for providing the rotational motion is complex and expensive.

However, the locking assemblage 80 of the present invention is locked with only a simple inward motion, easily achievable of conventional apparatus, and provides locking along substantially its entire periphery, a substantially full 360°. Accordingly, it will be appreciated, that the locking assemblage 80 provides many advantages over the typical prior art breech or bore locking mechanisms.

It will be understood by those skilled in the art that while the apparatus embodying the present invention has been disclosed in the context of deep drawing round or generally cylindrical articles, that the present invention is in no manner so limited. Further, that the present invention is equally applicable to the deep drawing of articles of any cross-sectional configuration; for example, should it be desired to deep draw a shell of rectangular cross-sectional configuration, the annular projections forming the extrusion die, the draw die and the draw ram would be suitably shaped of appropriate complementary rectangular configuration.

Also, it will be understood by those skilled in the art that the expression "high hydrostatic pressure" is a relative term, and that depending upon the ductility or brittleness of the material being drawn, the depth of the draw, and the length of the drawing radius, a greater or less amount of hydrostatic pressure will be required, the level of such hydrostatic pressure being that which increases the ductility of the material sufficiently to permit the desired deformation thereof without fracture. The actual amount of hydrostatic pressure required, for a given deep draw in view of the immediately foregoing considerations, can be determined empirically by performing several deep drawing operations on a series of identical blanks and under successively increased hydrostatic pressures, observing the quality of the deep draw as to the presence or absence of fracture and the uniformity of wall thickness, and increasing or decreasing the amount of applied "high hydrostatic pressure" accordingly.

It will be further understood by those skilled in the art that the expression "deep drawing," or "deep draw," is a term of art connoting a general class of methods for forming metals and other materials, into cupped, shell-like, or tubular configurations, and that the use of the methods of the present invention are equally applicable and advantageous to perform what to some could be considered to be a "shallow draw." Further, it will be understood, that the expression "deep drawing" or "deep draw," is used in a qualitative sense, that for example, the drawing of a blank of titanium to a depth of one-fourth (¼) inch, would, due to the brittleness of titanium, be a "deep draw."

What is claimed is:

1. Apparatus for deep drawing a blank of solid plastic material, which comprises:
   means for providing a pressure chamber for surrounding certain portions of said blank;
   means for providing a draw die;
   mechanical means, including a plurality of radially disposed segments in sliding interlocking engagement, for accommodating certain reactive forces created upon the pressurization of fluid to be placed in said chamber; and
   means engageable with certain other portions of said blanks and for deep drawing said blank into said draw die.

2. Apparatus for deep drawing a disc-shaped blank of solid plastic material, which comprises:
   means for providing an annular pressure chamber for surrounding a peripheral portion of said blank,
   said pressure chamber for receiving fluid to the pressurized to apply high hydrostatic pressure to said peripheral portion of said blank;
   means for providing an annular extrusion die;
   means for providing a draw die;
   mechanical means, including a plurality of radially disposed segments, for accommodating certain reactive fluid forces created upon the pressurization of said fluid, and for pre-stressing portions of said annular pressure chamber providing means against said certain reactive fluid forces; and
   means for engaging the central portion of said blank and for extruding said peripheral portion of said blank radially inwardly through said extrusion die and for deep drawing said extruded peripheral portion into said draw die.

3. Apparatus for deep drawing a blank of solid plastic material, which comprises:
   a pressure vessel having a bore formed therein;
   means insertable into said bore and for providing (i) a draw die, and (ii) a high pressure chamber for receiving a body of pressurized fluid and for closely accommodating an outer portion of said blank within said body of pressurized fluid, and including a pair of closed and opposed projections for "biting" into said blank to seal off a central portion of said blank from said outer portion thereof;
   a mechanical bore locking mechanism including a plurality of radially disposed, interlocked segments insertable into said bore and movable downwardly and radially outwardly to lock said bore and to cause said projections to accomplish said "biting"; and
   means for engaging the central portion of said blank and for deep drawing said blank into said draw die.

4. Apparatus for deep drawing a blank of solid plastic material, which comprises:
   a pressure vessel having a bore formed therein;
   a bottom plug secured in one end of said bore and providing a draw die;
   an annular retaining ring inserted into said bore for close accommodation therein and being in engagement with said bottom plug;
   a top plug dimensioned for ready insertion into the other end of said bore and for engaging said annular retaining ring;
   said plugs and said annular retaining ring having portions defining a high pressure chamber for receiving a body of fluid to be pressurized and for closely accommodating outer portions of said blank, and said plugs having opposed, closed projections formed thereon for "biting" into said blank and for sealing off a central portion of said blank from said outer portions thereof;
   a mechanical locking mechanism insertable into said other end of said bore and including a plurality of radially disposed, interlocked segments engageable with said top plug;
   said segments expandable radially outward to lock said bore and movable downwardly (i) to place said top plug in forced engagement with said annular retaining ring, (ii) to pre-stress said top plug against certain reactive fluid forces created upon the pressurization of said fluid, and (iii) to cause said projections to accomplish said "biting";
   said top plug and said segments for accommodating said certain reactive fluid forces;
   means for radially expanding said segments and for moving said segments downwardly;
   means for pressurizing said fluid to be placed in said chamber; and
   means for engaging said central portion of said blank and for extruding said outer portions inwardly through said projections, and for deep drawing said extruded peripheral portions into said draw die.

5. Apparatus for deep drawing a disc-shaped blank of solid plastic material, which comprises:
   a pressure vessel having a bore formed therein which bore is provided with a plurality of continuous rows of teeth formed axially of the bore along the upper portion thereof;
   a bottom plug insertable into said bore and being secured fixedly therein in the lower portion thereof;
   said bottom plug having a bore formed centrally therethrough to provide a draw die and being provided with (i) an annular inclined surface near the top portion thereof, (ii) an annular top surface, and (iii) an annular projection formed on the top surface thereof integral with said annular top surface and said draw die;
   an annular retaining ring of generally wedge-shaped cross-sectional configuration, said ring being dimensioned for close accommodation within said bore and being provided with annular inclined top and bottom surfaces;
   said annular retaining ring being inserted within said bore with the annular inclined bottom surface thereof being in engagement with the annular inclined top surface of said bottom plug;
   a top plug of generally annular cross-sectional configuration and being dimensioned for ready insertion into and removal from said pressure vessel bore;
   said top plug having a bore formed centrally therethrough and being provided with (i) annular inclined top and bottom surfaces, (ii) an annular bottom surface, and (iii) an annular projection formed on the bottom surface thereof integral with said annular bottom surface and the immediately aforesaid bore;
   said top plug for insertion into said bore of said pressure vessel such that the annular inclined bottom surface thereof engages the annular inclined top surface of said retaining ring, the bore formed therein is aligned vertically with the bore formed in said bottom plug, and the annular projection formed thereon is opposed to and aligned vertically with the annular projection formed on said bottom plug;
   said annular top and bottom surfaces of said plugs, said annular retaining ring, and said annular projections forming cooperatively an annular high pressure chamber for receiving a body of fluid and for closely accommodating a peripheral portion of a blank of solid plastic material to be placed in said chamber;
   said annular projections forming an annular extrusion die and said annular projections for "biting" into said blank to seal off a central portion of said blank from said peripheral portion thereof;
   a plurality of radially disposed segments insertable into said bore and having portions occupying a full 360°, and being provided with a plurality of rows of teeth complementary to the aforesaid plurality of rows of teeth;

a ram having a head portion and a tapered shank portion;

said segments defining a tapered bore for receiving said tapered shank portion and alternate ones of said segments being interconnected with said tapered shank portion to provide relative, sliding interlocking vertical movement between said shank portion and said alternate ones;

said segments being interconnected to provide relative, sliding, interlocking, radial movement therebetween and to permit said segments to move radially outwardly to occupy a full 360° peripheral portion of said bore, and the bottoms of said segments being interconnected with the annular inclined top surface of said top plug to permit relative, sliding, interlocking, radial movement of said segments relative to said top plug;

a spring surrounding said tapered portion of said ram with the upper end thereof being fixedly secured to the underside of said ram head portion and with the lower end thereof being fixedly secured to the top surface of at least one of said segments;

said spring and said interconnections for maintaining the aforesaid structure in a unitary assemblage;

said tapered shank portion of said ram, upon the insertion of said unitary assemblage into said pressure vessel bore and upon the impartation of relative vertical movement between said shank portion and said segments, for moving said alternate ones of said segments downwardly and radially outward and to cause said alternative ones to move the others of said segments downwardly and radially outwardly;

said plurality of rows of teeth provided on said segments, upon said downward and radially outward movement of said segments, engageable with said continuous rows of teeth provided in said bore to cause said segments to lock full 360° peripheral portion of said bore;

the downward movement of said segments being sufficient to place the annular inclined bottom surface of said top plug into forced engagement with the annular inclined top surface of said annular retaining ring, and for causing said opposed annular projections to "bite" into said blank and to seal off a central portion of said blank from said peripheral portion thereof;

means for pressurizing a body of fluid to be placed in said annular high pressure chamber to subject the the peripheral portion of said blank to high hydrostatic pressure;

a punch extendable through said bores formed in said ram and said top plug and for engaging a central portion of said blank and for extruding the peripheral portion of said blank, in cooperation with said high hydrostatic pressure, radially inwardly through said annular extrusion die, and said punch for deep drawing the extruded peripheral portion of said blank into said draw die; and means for operating said punch.

6. A breech or bore locking mechanism, comprising:

a reciprocable ram having a tapered shank portion;

a plurality of segments arrayed around said shank portion with the alternate ones thereof engaged with said shank portion in sliding, interlocking relationship permitting movement of said alternate ones vertically of said shank portion;

the adjacent sides of said segments engaged in sliding, interlocking relationship permitting movement of said segments radially outward and radially inward of said shank portion;

a plug member, the top of said plug member engaged with the bottoms of said segments in sliding interlocking relationship permitting the aforesaid radial movement of said segments; and said ram, upon relative vertical movement occurring between said ram and said segments, for moving said alternate ones of said segments radially outward and for causing said alternate ones to move the other ones of said segments radially outward whereby said segments lock said breech or bore in cooperation with said plug member.

7. Apparatus for locking a bore provided with a plurality of continuous rows of teeth and having a receiving surface formed therein, which comprises:

a plurality of radially disposed segments insertable into said bore and having portions occupying a full 360° and being provided with a plurality of rows of teeth complementary to the aforesaid plurality of rows of teeth;

a ram having a head portion and a tapered shank portion;

said segments defining a tapered bore for receiving said tapered shank portion and alternate ones of said segments being interconnected with said tapered shank portion to provide relative, sliding, interlocking, vertical movement between said shank portion and said alternate ones;

said segments being interconnected to provide relative, sliding, interlocking, radial movement therebetween, and to permit said segments to move radially outwardly to occupy a full 360° peripheral portion of said bore;

a plug member, the top of said plug member being interconnected with the bottoms of said segments to permit relative, sliding, interlocking, radial movement of said segments relative to said plug, and the bottom of said plug being provided with a surface for complementary engagement with said receiving surface provided in said bore;

a spring surrounding said tapered portion of said ram with the upper end thereof fixedly secured to the underside of said ram head portion and with the lower end thereof fixedly secured to the top surface of at least one of said segments;

said spring and said interconnections for maintaining the aforesaid structure in a unitary assemblage;

said tapered shank portion of said ram, upon the impartation of relative vertical movement between said shank portion and said segments, for moving said alternate ones of said segments downwardly and radially outward and to cause said alternate ones to move the others of said segments downwardly and radially outwardly;

said plurality of rows of teeth provided on said segments, upon said downward and radially outward movement of said segments, engageable with said continuous rows of teeth provided in said bore to cause said segments to lock a full 360° peripheral portion of said bore; and said surface formed on the bottom of said plug member, upon said downward movement of said segments, engageable with said receiving surface formed in said bore, whereby said segments and said plug member cooperatively lock the entirety of said bore.

8. A bore locking mechanism for locking a bore provided with a plurality of continuous rows of teeth and provided with a plug receiving surface, comprising:

a ram having a head portion and a tapered shank portion;

a plurality of segments arrayed around said shank portion and provided with a plurality of rows of teeth complementary to aforesaid rows of teeth;

the alternate ones of said segments engaged with said shank portion in sliding, interlocking relationship permitting movement of said alternate ones vertically of said shank portion;

the adjacent sides of said segments engaged in sliding, interlocking relationship permitting movement of said segments radially outward and radially inward of said shank portion;

a plug member, the top of said plug member engaged with the bottoms of said segments in sliding interlocking relationship permitting the aforesaid radial movement of said segments;

a spring surrounding said tapered shank portion, the upper end of said spring secured to said ram head portion and the lower end of said spring secured to at least one of said segments;

said tapered shank portion of said ram, upon the application of a suitable downward force to said cam, for compressing said spring and moving said alternate ones of said segments downwardly and radially outwardly, which alternate ones, in turn, move said others of said segments downwardly and radially outwardly, and said segments, in turn, move said plug member downwardly into forced engagement with said plug receiving surface;

said plurality of rows of teeth formed on said segments, upon said radial movement of said segments, engageable with said plurality of rows of teeth provided in said bore, to cause said segments and said plug member to lock said bore; and said compressed spring, upon the relief of said downward force, for moving said tapered shank portion upwardly, and said tapered shank portion upon being moved upwardly, for moving said alternate ones of said segments radially inwardly and upwardly, which alternate ones, in turn, move said others of said segments radially inwardly and upwardly, thereby causing disengagement of said engagement between said pluralities of rows of teeth and disengagement of said plug member from said plug receiving surface, whereby said bore is unlocked.

9. Deep drawing apparatus comprising:

a pressure chamber for applying pressure to a blank therein, said pressure chamber having bottom and side walls;

a closure for the pressure chamber including
    a removable plug for sealing off the top of the pressure chamber,
    a plurality of radially displaceable segments in sliding interlocking engagement for engaging and locking into the inner surface of the side walls of the pressure chamber and for applying force against the plug to secure it against pressure within the pressure chamber, and means in sliding interlocking engagement with said segments for moving the segments radially into and out of locking position;

a draw die in communication with the pressure chamber; and means projectable through the pressure chamber for drawing the blank into the draw die.

10. Deep drawing apparatus according to claim 9 wherein the side walls of the pressure chamber are provided with an inwardly projecting surface and said plug is provided with a surface complementary to said projecting surface for closing off and sealing the pressure chamber.

11. Apparatus for drawing a blank of material comprising:

a pressure chamber for surrounding a portion of said blank;

a draw die;

draw means for drawing said blank into said draw die; and means independent of said draw means for supporting reactive forces generated by the pressurization of fluid to be placed in said chamber, said means independent of said draw means comprising a plurality of radially disposed segments in sliding interlocking engagement, radially displaceable into and out of position for supporting said reactive forces.

12. Apparatus according to claim 11 wherein said pressure chamber includes a plug member in engagement with said means independent of said draw means, and wherein said plug member and said means independent of said draw means are axially displaceable from said means for providing a draw die.

References Cited

UNITED STATES PATENTS

| | | | |
|---|---|---|---|
| 1,189,823 | 7/1916 | Hulbert | 72—393 |
| 1,616,978 | 2/1927 | MacClatchie | 220—24.5 |
| 1,823,047 | 9/1931 | Hothersall | 72—393 |
| 2,421,935 | 6/1947 | Gosnell | 72—393 |
| 2,820,481 | 1/1958 | Hix | 220—24.5 |
| 2,821,156 | 1/1958 | Lyon. | |
| 2,847,957 | 8/1958 | Watter et al. | 72—56 |
| 2,943,667 | 7/1960 | Ewing et al. | 72—393 |
| 3,172,928 | 3/1965 | Johnson. | |
| 3,314,276 | 4/1967 | Peyton | 72—393 |

RICHARD J. HERBST, Primary Examiner

U.S. Cl. X.R.

72—347; 220—24

UNITED STATES PATENT OFFICE
CERTIFICATE OF CORRECTION

Patent No. 3,459,021                                  August 5, 1969

Francis Joseph Fuchs, Jr.

It is certified that error appears in the above identified patent and that said Letters Patent are hereby corrected as shown below:

Column 7, line 46, "is" should read -- as --. Column 9, line 23, "the" should read -- be --. Column 11, line 39, afte "lock" insert -- a --.

Signed and sealed this 9th day of December 1969.

(SEAL)
Attest:

Edward M. Fletcher, Jr.                        WILLIAM E. SCHUYLER, JR.
Attesting Officer                                     Commissioner of Patents